F. THOMS.
RATCHET MECHANISM.
APPLICATION FILED AUG. 5, 1909.

983,463.

Patented Feb. 7, 1911.

Attest:
Ewd L. Tolson
Edward N. Sarton

Inventor:
Frederick Thoms,
By Spear & Seely
Attys.

UNITED STATES PATENT OFFICE.

FREDERICK THOMS, OF OAKLAND, CALIFORNIA.

RATCHET MECHANISM.

983,463.  Specification of Letters Patent.  Patented Feb. 7, 1911.

Application filed August 5, 1909. Serial No. 511,351.

*To all whom it may concern:*

Be it known that I, FREDERICK THOMS, a citizen of the United States, residing at Oakland, in the county of Alameda and State of California, have invented new and useful Improvements in Ratchet Mechanism, of which the following is a specification.

My invention relates to a ratchet and pawl, and it is particularly designed for use with the operating mechanism for extending and collapsing that class of awnings which are operated by a revolving roller and its usual train of connecting mechanism, and for retaining such an awning in any extended or collapsed position as desired. This part of the operating mechanism of an awning is, in most instances, exposed to the weather, and the devices now in general use for this purpose rapidly become inoperative, or become unreliable in use, because of deterioration due to rust, or other such causes, because of such exposure.

The object of the invention is to produce a device of the class stated which will be unaffected by exposure to weather; simple of construction; inexpensive of manufacture, easy of manipulation, and effective when in use.

Figure 1:
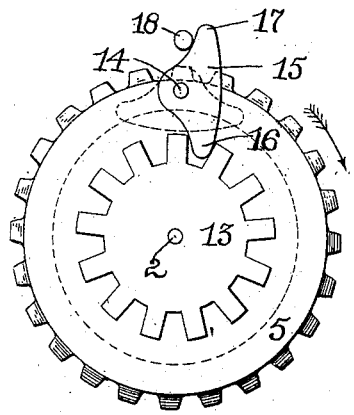
Figure 3:
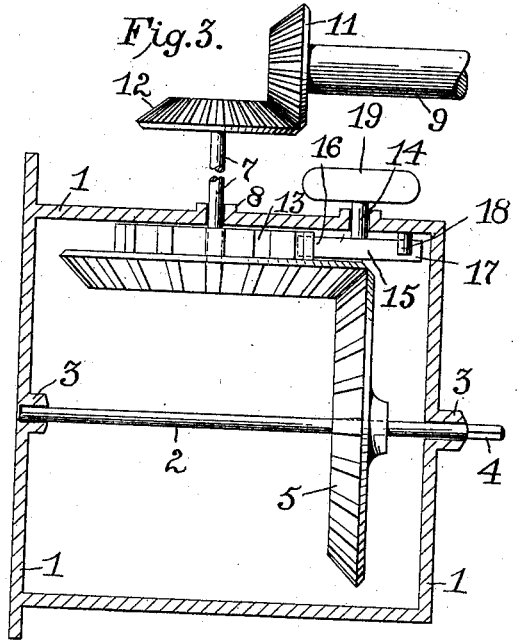
Figure 2:
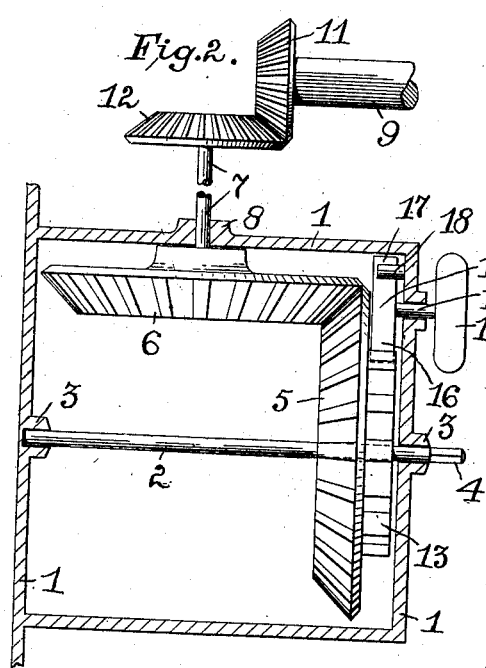
Figure 4:
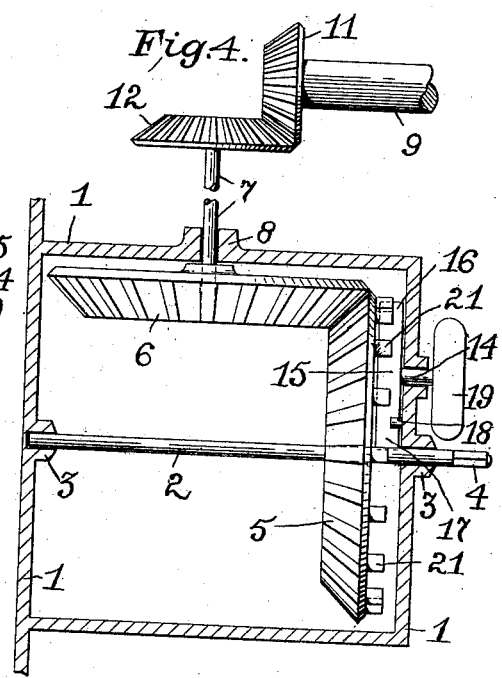

An embodiment of my invention is illustrated by the accompanying drawings, which form a part of this specification, and in which:

Figure 1 is a plan of my invention, Fig. 2 is a section of a part of the operating mechanism of an awning showing my invention, and Figs. 3 and 4 are modifications.

Similar characters refer to similar parts throughout the drawings.

In Fig. 2 I show at 1 a casing, as in general use in such devices, in which is journaled the shaft 2 in the journals 3. This shaft 2 is extended beyond the casing 1 at one of its journals and provided, as shown, at 4 for the reception of a crank, or other means, by which it may be manually, or otherwise, operated.

Mounted on the shaft 2 is the beveled geared wheel 5, which is in mesh with the beveled geared wheel 6 on the shaft 7, that is also journaled, as shown, at 8 in the case 1. This shaft 7 extends to and operates a roller 9 on which, in structures of this character the awning fabric is wound, or unwound, in any well known manner, and I have shown it by means of the beveled geared wheels 11 and 12 in mesh, with the wheel 12 mounted on the shaft 7 and the wheel 11 mounted on the roller 9. Also mounted on the shaft 2 is the toothed wheel 13. In construction I prefer that this toothed wheel 13 be integral with the beveled geared wheel 5, as I have shown it in Fig. 2, or integral with the beveled geared wheel 6, as I have shown it in Fig. 3.

Rotatably mounted in the case 1 is the shaft 14 in which is mounted the pawl 15. This pawl is so adapted, and so mounted, that either one or the other of its ends, or points, 16 and 17 can be brought into the recesses between the teeth of the toothed wheel 13, and in engagement with any one of the teeth of the said wheel. A pin, or stopper, 18, rigidly mounted in the case 1 is provided and adapted to on either one or the other of its sides engage the end of the pawl that is out of engagement with any one of the teeth of the toothed wheel 13. On the shaft 14 is the button 19, or other suitable device, so provided that the pawl 15 may be conveniently manually operated.

It will be seen (referring to Fig. 1) that the wheel 5 and its integral toothed wheel 13 will be held against rotation in the direction as indicated by the arrow when the end 16 of the pawl 15 is engaged, as shown, with one of the teeth of the wheel 13, and the end 17 of the pawl is in engagement with the stopper 18. Should the pawl 15 be turned, as by means of the button 19, to the position as shown by the dotted lines, the wheel 13, and its integral wheel 5, will be allowed free rotary movement in either direction. Should the pawl 15 be turned so that its end 17 be in engagement with one of the teeth of the toothed wheel 13 and its end 16 be in engagement with the stopper 18 the wheel 13 and the wheel 5 will be held against rotation in the direction opposite to that indicated by the arrow. By this action, it will be seen, that the shaft 7, which through any desired train of mechanism operates the roller 9 on which the awning fabric is wound, or unwound, will be held from rotation as desired and the awning held in the required position.

In the modification shown in Fig. 3 I show the toothed wheel 13 mounted on the shaft 7 and integral with the beveled geared wheel 6. I also show the pawl member 15 mounted adjacent to the said toothed wheel 13, and operated with it in a similar manner to that described.

In Fig. 4 I show a still further modification of my invention in which in place of the toothed wheel 13 I provide a plurality of spaced projections 21 on the one side of the beveled wheel 5 against which either one or the other end of the pawl member 15 engage as in the same manner as with the teeth of the toothed wheel 13 shown and described in Figs. 2 and 3. It will be seen that these projections 21 may be provided on the geared wheel 6 and with the pawl mounted on the upper side of the casing 1.

Having thus described my invention, what I claim as new and desire to secure by Letters Patent is:

In a device of the class described, a casing, gearing therein, teeth connected with one member of said gearing, a shaft projecting through said casing, a double pawl on said shaft, means for rocking said shaft to bring one end of the pawl into engagement with the said teeth, and a stop pin on the casing for preventing the complete rotation of said pawl.

In testimony whereof I have affixed my signature in the presence of two witnesses, this 21st day of July 1909.

FREDERICK THOMS.

Witnesses:
 FRANK L. OWEN,
 A. DIXON.